(12) United States Patent
Watanabe et al.

(10) Patent No.: US 8,743,123 B2
(45) Date of Patent: Jun. 3, 2014

(54) VISUALIZATION PROCESSING METHOD AND APPARATUS WITH MASK SURFACE

(75) Inventors: Masahiro Watanabe, Kawasaki (JP); Toshiaki Hisada, Tokyo (JP); Seiryo Sugiura, Tokyo (JP); Takumi Washio, Tokyo (JP); Jun-ichi Okada, Tokyo (JP); Yoshimasa Kadooka, Kawasaki (JP)

(73) Assignees: Fuhitsu Limited, Kawasaki (JP); The University of Tokyo, Tokyo (JP)

( * ) Notice: Subject to any disclaimer, the term of this patent is extended or adjusted under 35 U.S.C. 154(b) by 460 days.

(21) Appl. No.: 13/110,996

(22) Filed: May 19, 2011

(65) Prior Publication Data

US 2011/0292039 A1    Dec. 1, 2011

(30) Foreign Application Priority Data

May 27, 2010  (JP) .................................. 2010-121829

(51) Int. Cl.
  *G06T 11/20*    (2006.01)
  *G06T 15/00*    (2011.01)
  *G09G 5/00*     (2006.01)

(52) U.S. Cl.
  USPC ............................ 345/440; 345/419; 345/624

(58) Field of Classification Search
  None
  See application file for complete search history.

(56) References Cited

U.S. PATENT DOCUMENTS

| | | | |
|---|---|---|---|
| 5,113,490 A * | 5/1992 | Winget | 345/419 |
| 5,570,433 A | 10/1996 | Nagamine et al. | |
| 6,167,142 A | 12/2000 | Nozaki | |
| 6,310,620 B1 * | 10/2001 | Lauer et al. | 345/424 |
| 6,373,483 B1 * | 4/2002 | Becker et al. | 345/419 |
| 6,570,566 B1 | 5/2003 | Yoshigahara | |
| 2004/0125103 A1 * | 7/2004 | Kaufman et al. | 345/419 |
| 2005/0068313 A1 | 3/2005 | Morimitsu et al. | |
| 2006/0046844 A1 * | 3/2006 | Kaneko | 463/32 |

(Continued)

FOREIGN PATENT DOCUMENTS

| | | |
|---|---|---|
| JP | 63-298489 | 12/1988 |
| JP | 2-197965 | 8/1990 |

(Continued)

OTHER PUBLICATIONS

Rezk-Salama et al.; Interactive exploration of volume line integral convolution based on 3D-texture mapping; VIS '99 Proceedings of the conference on Visualization '99: celebrating ten years, pp. 233-240; IEEE Computer Society Press, 1999.*

(Continued)

*Primary Examiner* — Carlos Perromat
(74) *Attorney, Agent, or Firm* — Staas & Halsey LLP

(57) ABSTRACT

This method includes: generating data of a mask surface with respect to visualization data arranged in a virtual three-dimensional space, for calculation values at respective calculation points; identifying, from a first data storage storing, as time-series data, positions of the calculation points and calculation values at the calculation points, a first point whose position is closest to a predetermined point on the mask surface; reading out, from the first data storage, a position of the identified first point in each time; arranging the mask surface in each time based on a direction of a user's sight line and the read position in each time so as to make the mask surface perpendicular to the direction of the user's sight line and have the predetermined point on the mask surface arranged at the read position; and drawing polygon data of the visualization data and the mask surface in time series.

9 Claims, 19 Drawing Sheets

(56) References Cited

U.S. PATENT DOCUMENTS

| | | | | |
|---|---|---|---|---|
| 2006/0284786 | A1* | 12/2006 | Takano et al. | 345/1.1 |
| 2008/0024493 | A1* | 1/2008 | Bordoloi et al. | 345/423 |
| 2009/0009517 | A1* | 1/2009 | Palmer | 345/440 |
| 2009/0079738 | A1* | 3/2009 | Liao | 345/427 |
| 2009/0174729 | A1* | 7/2009 | Matsumoto | 345/619 |
| 2011/0228055 | A1* | 9/2011 | Sharp | 348/51 |

FOREIGN PATENT DOCUMENTS

| | | |
|---|---|---|
| JP | 05-040951 | 6/1993 |
| JP | 08-315173 | 11/1996 |
| JP | 11-184898 | 7/1999 |
| JP | 2000-194878 | 7/2000 |
| JP | 2000-354257 | 12/2000 |
| JP | 2002-136519 | 5/2002 |
| JP | 2005-100115 | 4/2005 |
| JP | 2005-157924 | 6/2005 |
| JP | 2007-66055 | 3/2007 |
| WO | 2010/070532 A2 | 6/2010 |

OTHER PUBLICATIONS

Hoppe H., "Progressive Meshes", Computer Graphics Proceedings, Siggraph '96, ACM, New York, US, Jan. 1, 1996, pp. 100-102.
Liang K. et al., "Interactive Parallel Visualization of Large Particle Datasets", Parallel Computer, Elsevier Publishers, Amsterdam, NL, vol. 31, No. 2, Feb. 1, 2005, pp. 243-260.
Cignoni P. et al., "Multiresolution Representation and Visualization of Volume Data", Oct. 1, 1997, IEEE Transactions on Visualization and Computer Graphics, IEEE Service Center, Los Alamitos, CA, US, pp. 352-269.
European Search Report dated Jul. 25, 2011 in corresponding European Patent Application 11163832.6.
Japanese Office Action mailed Nov. 12, 2013 in corresponding Japanese Application No. 2010-121829.
Masahi Shimizu et al., "Real-Time Visualization of 3D Numerical Simulation Based on Vertex Processing on GPU", VC/GCAD Joint Symposium 2007 Proceeding, Jun. 23, 2007, 163-168.
Nobuko Kato et al., "A High-Speed Display Method for 3-D Object World Based on Optimal Shape Simplification", The IEICE Transactions, The Institute of Electronics, Information and Communication Engineers, vol. J76-D-II, No. 8, Aug. 25, 1993, pp. 1712-1721.

* cited by examiner

| CALCULATION POINT ID | POSITION DATA | | |
|---|---|---|---|
| | x | y | z |
| n001 | $x_1$ | $y_1$ | $z_1$ |
| n002 | $x_2$ | $y_2$ | $z_2$ |
| n003 | $x_3$ | $y_3$ | $z_3$ |
| ⋮ | ⋮ | ⋮ | ⋮ |

FIG.7

| ELEMENT ID | ID 1 | ID 2 |
|---|---|---|
| l001 | n001 | n002 |
| l002 | n002 | n003 |
| l003 | n003 | n004 |
| ⋮ | ⋮ | ⋮ |

FIG.8

| ELEMENT ID | ID 1 | ID 2 | ID 3 | ID 4 |
|---|---|---|---|---|
| q001 | n101 | n102 | n103 | n104 |
| q002 | n105 | n106 | n107 | n108 |
| ⋮ | ⋮ | ⋮ | ⋮ | ⋮ |

FIG.9

| ELEMENT ID | POSITION DATA | | |
|---|---|---|---|
| | x | y | z |
| q001 | $x_{c1}$ | $y_{c1}$ | $z_{c1}$ |
| ⋮ | ⋮ | ⋮ | ⋮ |
| l003 | $x_{c2}$ | $y_{c2}$ | $z_{c2}$ |
| ⋮ | ⋮ | ⋮ | ⋮ |

FIG.10

| CALCULATION POINT ID | PHYSICAL VALUE |
|---|---|
| n001 | a |
| n002 | b |
| n003 | c |
| n004 | d |
| ⋮ | ⋮ |

FIG.11

| INITIAL SETTING DATA OF MASK SURFACE | |
|---|---|
| SHAPE | CIRCLE |
| COLOR | ADAPTIVE/FIXED COLOR (WHITE) |
| α VALUE | $\alpha_0$ |
| DISTANCE | $d_0$ |
| INITIAL CAMERA POSITION | $(x_0, y_0, z_0)$ |
| INITIAL DIRECTION OF SIGHT LINE | $(x_{v0}, y_{v0}, z_{v0})$ |

FIG.12

| POLYGON ID |
|---|
| P001 |
| P002 |
| P003 |
| ⋮ |

FIG.13A

| COLOR | color 1 |
|---|---|
| $\alpha$ VALUE | $\alpha_{p1}$ |
| VERTEX 1 | v001 |
| VERTEX 2 | v002 |
| VERTEX 3 | v003 |

FIG.13B

| VERTEX ID | POSITION DATA | | |
|---|---|---|---|
| | x | y | z |
| v001 | $x_{v1}$ | $y_{v1}$ | $z_{v1}$ |
| v002 | $x_{v2}$ | $y_{v2}$ | $z_{v2}$ |
| v003 | $x_{v3}$ | $y_{v3}$ | $z_{v3}$ |
| ⋮ | ⋮ | ⋮ | ⋮ |

FIG.13C

| CAMERA POSITION | | | DIRECTION OF SIGHT LINE | | | DISTANCE |
|---|---|---|---|---|---|---|
| x | y | z | x | y | z | |
| $x_c$ | $y_c$ | $z_c$ | $x_v$ | $y_v$ | $z_v$ | $d_m$ |

| CENTER POSITION | $x_{cc}, y_{cc}, z_{cc}$ |
|---|---|

| ID OF POINT OF INTEREST | I101 |

VISUALIZATION PROCESSING METHOD AND APPARATUS WITH MASK SURFACE

CROSS-REFERENCE TO RELATED APPLICATIONS

This application is based upon and claims the benefit of priority of the prior Japanese Patent Application No. 2010-121829, filed on May 27, 2010, the entire contents of which are incorporated herein by reference.

FIELD

This technique relates to a visualization technique of data such as numerical calculation results.

BACKGROUND

Enormous sized data that exceeds terabytes or petabytes is sometimes outputted from an application that is executed on a large-scale computer. This output data is data expressing a wide variety of phenomena such as physical or chemical phenomena, and in order to observe such phenomena, graphical illustration (or in other words, visualization) of that output data is required. However, when simply making visual all of the data that is outputted from a simulator in fields such as biology, nanotechnology or the environment, there are cases in which, due to complex arrangement of data in space, a portion that is to be paid attention to cannot be observed because of data that is behind that area of interest. For example, as illustrated in FIG. 1, when vectors representing physical quantities that are obtained through numerical calculation (generally, includes simple calculation values that are not physical quantities) are arranged at plural points in 3D space without any design or plan, it is not possible to easily recognize what kind of phenomena or condition is portrayed.

With respect to such situation, conventionally, a method of observing the 3D space after deleting unnecessary areas is a typical method, however, as the amount of data increases on a large-scale, the task itself of setting unnecessary areas before searching for and determining areas of interest is difficult. Moreover, because the data structure differs depending on the respective method of simulation, it is difficult to separate out areas of interest. There has been no effective method for solving such problems.

Incidentally, there is a technique for realizing the blur similar to that in real-world cameras in graphics. More specifically, with respect to a depth point that is to be focused on and was selected according to the desire of an operator operating a graphics terminal, a calculation processing unit finds the Z-axis distance of that depth point from 3D data of an object, which is stored in a data storage unit, and the calculation processing unit uses a "blur function" to further calculate the degree of the blur of that object according to the Z-axis distance that was calculated, and provides the degree of the blur to a display processing unit together with the object data. The display processing unit displays the object on a display screen according to that object data and blur function. By doing so, in the virtual space whose center of the screen is the depth point, objects having a larger absolute value distance along the Z axis are displayed with the blur. However, a processing that is normally not performed for the 3D data of the object is required, and when there is an enormous amount of 3D data, the processing load is large.

Moreover, a technique also exists in which, in order to display a stereo image that is closer to an object in real space, the blur is generated in an image for areas other than the point of interest included in a display image, according to the distance with the object, which is an element that is the object of attention, or the like. More specifically, the position of the point of interest is acquired, and a blurred image is generated based on 3D information relating to the display image. When generating the blurred image, the distance of the display element, which is arranged at the position corresponding to the position of the point of interest, from the viewpoint is calculated as a reference distance, and display elements whose difference from the reference distance exceeds a predetermined threshold value become a target of a generation processing of the blurred image. In the case of such a kind of processing as well, a special generation processing of the blurred image must be carried out for each of the display elements having a distance longer than the reference distance, and thus the processing load is high.

Furthermore, there is also a technique for displaying blurred polygons in at least one of the front direction and rear direction of the point of interest in a virtual space. More specifically, based on 3D coordinates in the virtual space, the Z value of each polygon is calculated in the depth direction from the position of the viewpoint, and a first image is generated by carrying out the perspective transformation of only polygons having a small Z value onto a screen plane. The perspective transformation is a processing to conduct the coordinate transformation based on the screen transformation matrix M. Moreover, the second image is generated by deteriorating the image quality of the first image and making the size of the second image equal to the size of the first image. Then, in order to display each of polygons in the first image at and around the depth position of the point of interest, and to display each of polygons in the second image when going in the direction toward the rear of the point of interest, a processing for making the first image semitransparent based on a transparency factor $\alpha$, which is calculated based on the Z values of the respective polygons is carried out, and the processed first image is synthesized with the second image to generate the display image. According to this technique, a special processing is required in which, after generating a special first image, the second image corresponding to the first image is generated.

Moreover, a technique is known in which, in the process of determining the position of objects and generating 2D images of the objects, a 2D image having a simplified shape is generated for objects that are located far away from the position of the viewpoint, and generation of a 2D image itself is omitted for objects that are located even further away from the position of the viewpoint, and such objects are not displayed. In case of adopting such a kind of technique, when the position of the viewpoint gradually gets further away from a certain object, and reaches the point away from the certain object by a certain distance, the object, which was drawn in detail up to that point, is changed suddenly to a rough drawing, or when the position of the viewpoint gradually moves closer from a position far from a certain object, and reaches the point away from the certain object by a certain distance, the object that was not displayed up to that point suddenly appears on the screen. So, there is a problem in that a person viewing that graphic image has a feeling of something being strange at the point where the precision of the drawing changes, or at the point where the display of the object is switched between displaying and not displaying. In order to solve such a kind of problem, there is a technique, which provides a graphics apparatus for generating and outputting a 2D image of an object as seen from a designated position of the viewpoint in the direction of the designated view line, based on 3D structure data that expresses the structure of an object. This graphics apparatus includes a semitransparent plane positioning means for determining a position at arranging a semitransparent plane at the position of the view point, which corresponds to calculation for defocusing the objects located on the far side in the direction of the view line: and image defocusing means for performing a defocusing operation for a 2D image or part of the 2D image that corresponds to an object or part of the object that is located behind the position of the semitransparent plane that was arranged by the semitransparent plane positioning means, when viewed from the viewpoint in the direction of the view line. However, the semitransparent plane is a means for defocusing objects that are far from the viewpoint to some degrees and that originally can hardly be seen, and is not something to be used by a user to intentionally designate a desired range to be viewed.

As described above, there is no technique for displaying a region to which the user wants to pay attention in a form that makes it easier to grasp the region, when the large amount of data such as the numerical calculation results is visualized.

SUMMARY

A mask processing method includes: generating data of a mask surface with respect to visualization data for calculation values at respective calculation points, wherein the visualization data is arranged in a virtual three-dimensional space; identifying, from a numerical value data storage unit storing, as time-series data, positions of the respective calculation points and calculation values at the respective calculation points, a first point whose position is closest to a predetermined point on the mask surface; reading out, from the numerical value data storage unit, a position of the identified first point in each time; arranging the mask surface in each time based on a direction of a user's sight line and the read position in each time so as to make the mask surface perpendicular to the direction of the user's sight line and have the predetermined point on the mask surface arranged at the read position; and instructing to draw polygon data relating to the visualization data and polygon data relating to the mask surface in time series.

A mask processing method according to a second aspect of this technique include: generating data of a mask surface for visualization data for calculation values at respective calculation points, wherein the visualization data is arranged in a virtual three-dimensional space; arranging the mask surface at a position away from a camera position by a predetermined distance in a direction of a sight line in the virtual three-dimensional space, according to data stored in a data storage unit storing data of the camera position and the direction of the sight line and data defining an arrangement position of the mask surface on the direction of the sight line; instructing to draw first polygon data relating to the visualization data and second polygon data relating to the mask surface without any discrimination of the first and second polygon data; accepting a change instruction of data defining the arrangement position of the mask surface from a user, and updating data relating to the change instruction in the data storage unit; and executing the arranging and the instructing in response to the accepting and updating.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting an example of data stored in a numerical data storage unit;

FIG. 8 is a diagram depicting an example of data stored in the numerical data storage unit;

FIG. 9 is a diagram depicting an example of data stored in the numerical data storage unit;

FIG. 10 is a diagram depicting an example of data stored in the numerical data storage unit;

FIG. 11 is a diagram depicting an example of data stored in the numerical data storage unit;

FIG. 12 is a diagram depicting an example of data stored in an initial setting data storage unit;

FIG. 13A is a diagram depicting an example of data stored in a polygon data storage unit;

FIG. 13B is a diagram depicting an example of data stored in the polygon data storage unit;

FIG. 13C is a diagram depicting an example of data stored in the polygon data storage unit;

DESCRIPTION OF EMBODIMENTS

Figure 2:
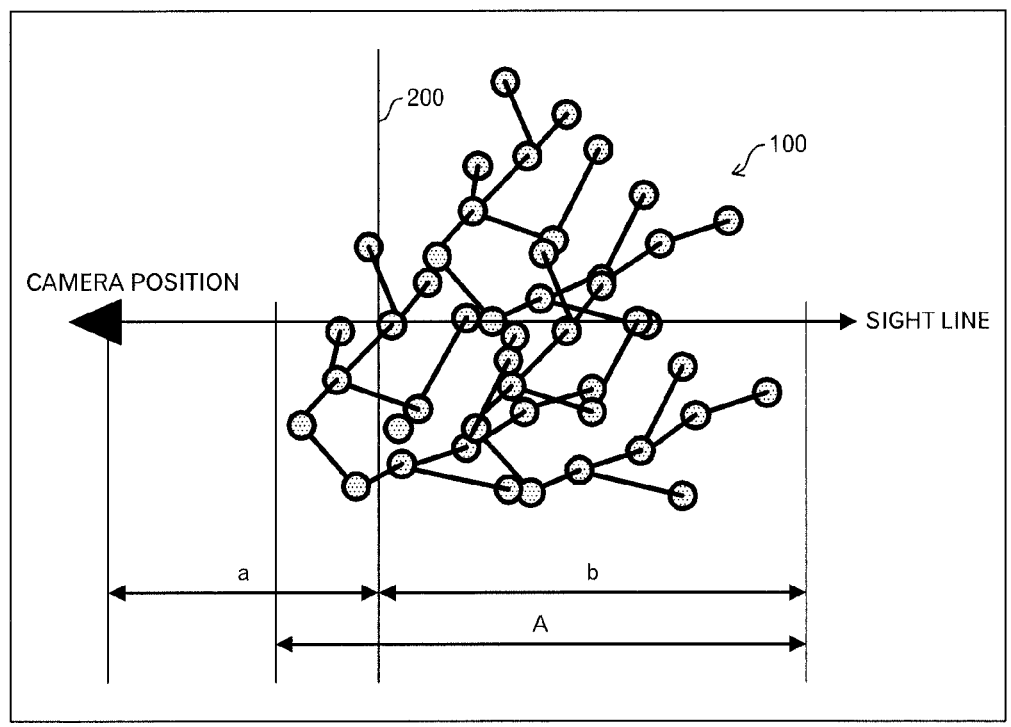
FIG. 2 is a diagram schematically depicting a relation between the visualization data and a mask surface.

Before explaining the configuration of the visualization data display processing apparatus relating to this embodiment, an overview of this embodiment will be explained. FIG. 2 schematically illustrates the scene of visualization data 100 having the depth length A in the direction of the sight line from the camera position as viewed by a user from the side. In this embodiment, a mask surface 200 is located at a position away from the camera position (also called the viewpoint) by the distance "a" in order to set an area in front of the mask surface 200 as an area of interest. Accordingly, it becomes easy for the user to see only a portion of interest in the visualization data 100, which is located within the area of interest. In other words, the portion of the visualization data 100 within the distance "b" included in the depth length A is masked by the mask surface 200 so that there is no adverse effect on the display of the portion of interest in the visualization data 100. Incidentally, by setting the mask surface 200 at an appropriate position, it is possible to set a portion desired by the user as the portion of interest.

Figure 1:
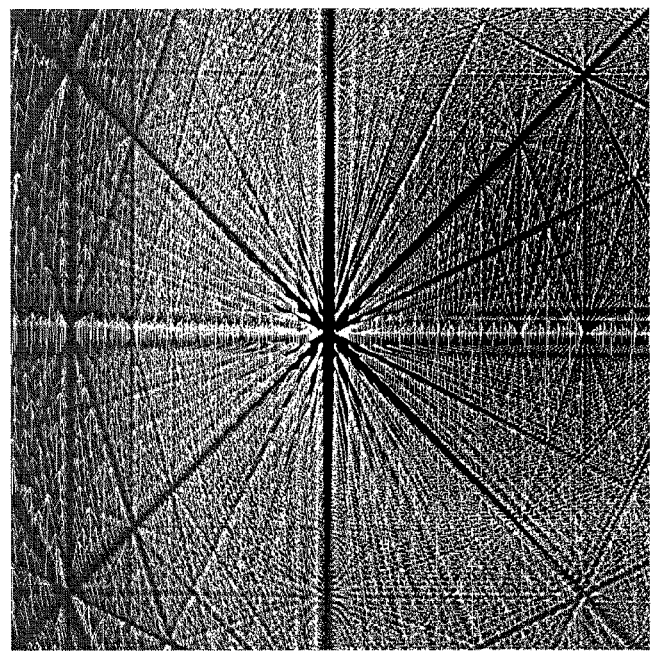
FIG. 1 is a diagram depicting a conventional display example of visualization data.
Figure 3:
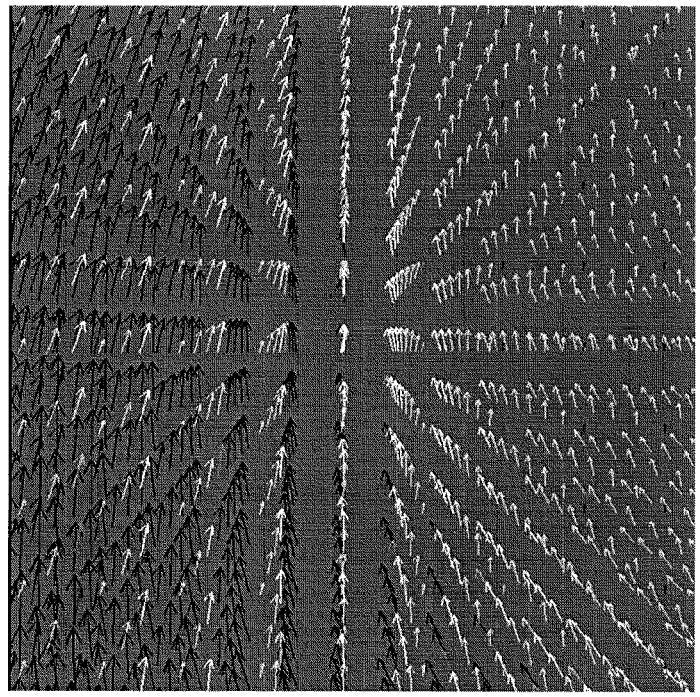
FIG. 3 is a diagram depicting a display example of the visualization data, which relates to this embodiment.

As illustrated in FIG. 2, by employing the mask surface 200, the display depicted in FIG. 1 changes as illustrated in FIG. 3. In other words, individual arrows that represent physical quantities become clearly visible (in FIG. 3, a color image is converted to a grayscale image so the "white" color is difficult to see). That is, the display of the portion of interest in the visualization data 100 becomes easy to discern.

Figure 4:
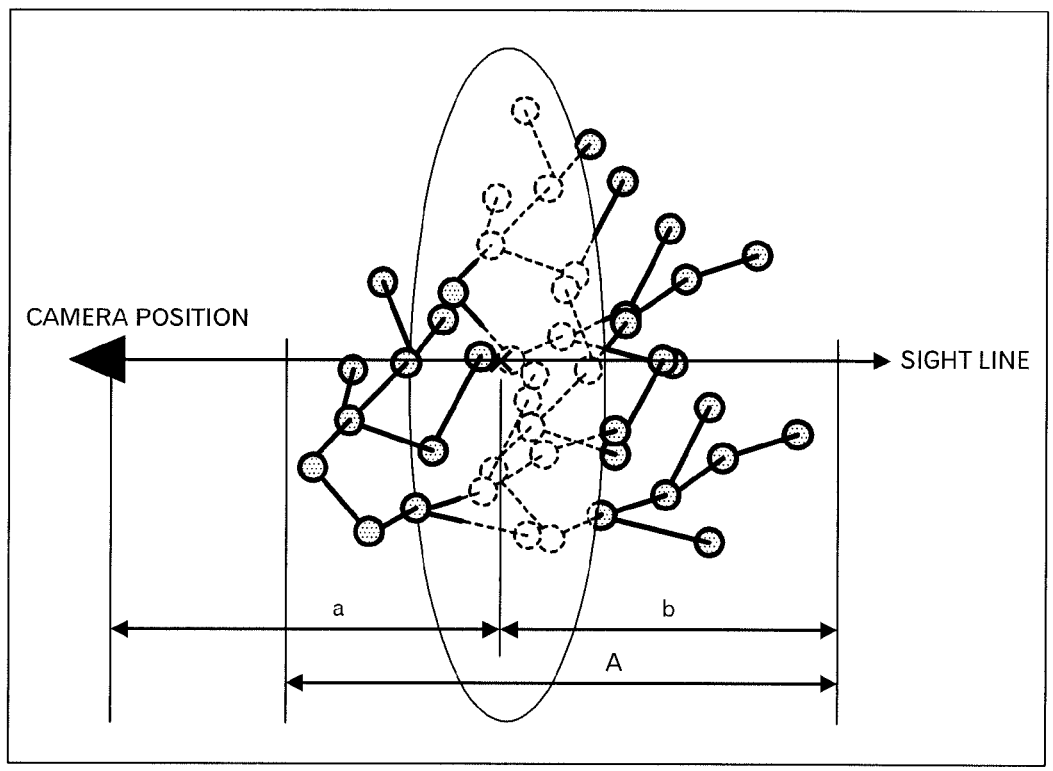
FIG. 4 is a diagram to explain the linking of the mask surface.

Moreover, the visualization data 100 may be generated as time-series data. In other words, the form and position of the visualization data 100 change according to time. In such a case, simply placing the mask surface 200 at a position separated a distance "a" from the camera position does not absolutely mean that the portion of interest in the visualization data 100 will be displayed such that it is easy to discern. In other words, the portion of interest may move backward behind the mask surface 200. Therefore, when the visualization data 100 changes over time, as illustrated in FIG. 4, the mask surface 200 is linked in the initial state with an element X (for example, particles or a bond between particles) that is located at the boundary between the portion of interest and the portion that is not of interest in the visualization data 100. By placing the mask surface 200 so that it orthogonally crosses the sight line, the portion of interest in the visualization data 100 is always located in front of the mask surface 200 at time after the linking. Therefore, even when the visualization data 100 may change over time, the portion of interest continues to be displayed so that it is easily identified.

Figure 5:
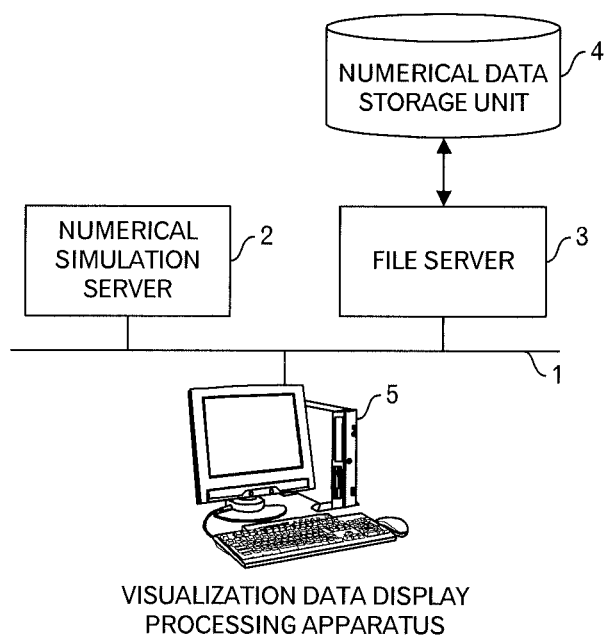
FIG. 5 is diagram depicting an outline of a system relating to this embodiment.

A system for realizing the outline described above in this embodiment will be explained below. For example, as illustrated in FIG. 5, a numerical simulation server 2 that performs simulation in fields such as biology, technology, environment and the like, a file server 3 that manages a numerical data storage unit 4 that stores that numerical data (also called "numerical value data") resulting from the simulation that was performed by the numerical simulation server 2, and a visualization data display processing apparatus 5 that performs the main processing of this embodiment and has a display device are connected to a network 1 such as an LAN (Local Area Network). The visualization data display processing apparatus 5 acquires numerical data that is the object of visualization from among the numerical data stored in the numerical data storage unit 4, from the file server 3, and performs the processing described below.

Figure 6:
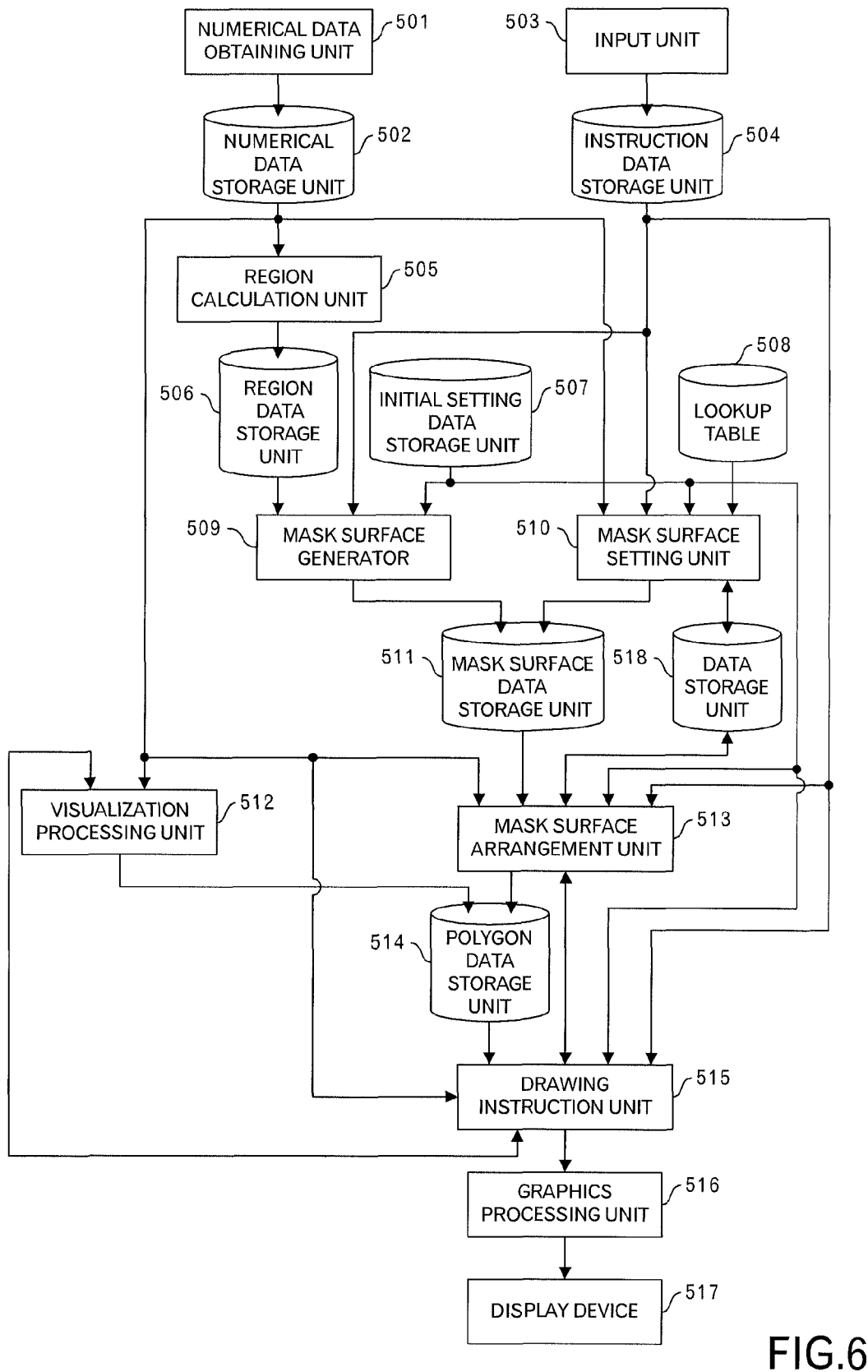
FIG. 6 is a functional block diagram of a visualization data display processing apparatus.

Next, FIG. 6 illustrates a functional block diagram of the visualization data display processing apparatus 5. The visualization data display processing apparatus 5 has: (A) a numerical data obtaining unit 501 that obtains numerical data that is the object of visualization and is stored in the numerical data storage unit 4 from the file server 3; (B) a numerical data storage unit 502 that stores the numerical data obtained by the numerical data obtaining unit 501; (C) an input unit 503 that accepts instructions from a user; (D) an instruction data storage unit 504 that stores data concerning the instruction from the user, which was received by the input unit 503; (E) a visualization processing unit 512 that performs a known visualization processing from the numerical data stored in the numerical data storage unit 502; (F) a region calculation unit 505 that performs a processing using data that is stored in the numerical data storage unit 502; (G) a region data storage unit 506 that stores processing results of the region calculation unit 505; (H) an initial setting data storage unit 507 that stores initial setting data; (I) a known lookup table 508 for colors; (J) a mask surface generator 509 that performs a processing using data stored in the region data storage unit 506, initial setting data storage unit 507 and instruction data storage unit 504; (K) a mask surface setting unit 510 that performs a processing using the numerical data storage unit 502, instruction data storage unit 504, initial setting data storage unit 507 and lookup table 508; (L) a mask surface data storage unit 511 that stores data that was generated by the mask surface generator 509 and mask surface setting unit 510; (M) a mask surface arrangement unit 513 that performs a processing for arranging the mask surface at a specific position in 3D virtual space using data that is stored in the numerical data storage unit 502, mask surface data storage unit 511, initial setting data storage unit 507 and instruction data storage unit 504; (N) a polygon data storage unit 514 that stores the processing results from the visualization processing unit 512 and mask surface arrangement unit 513; (O) a drawing instruction unit 515 that performs a processing using data that is stored in the numerical data storage unit 502, polygon data storage unit 514, initial setting data storage unit 507 and instruction data storage unit 504; (P) a graphics processing unit 516 that performs a known processing for drawing according to instructions and data from the drawing instruction unit 515; (Q) a display device 517 that displays the processing results of the graphics processing unit 516; and (R) a data storage unit 518 that stores data that was used by the mask surface arrangement unit 513 and mask surface setting unit 510.

Incidentally, the visualization processing unit 512 cooperates together with the drawing instruction unit 515, in order to obtain synchronization, for example. Moreover, the drawing instruction unit 515 and mask surface arrangement unit 513 cooperate with each other to carry out a processing described below. Furthermore, the drawing instruction unit 515 is able to reference the numerical data storage unit 502.

Next, an example of data that the numerical data obtaining unit 501 obtains from the file server 3 and stores into the numerical data storage unit 502 will be illustrated in FIG. 7 to FIG. 11. FIG. 7 illustrates a table representing position data at calculation points in the virtual space, for which physical quantities (typically, this also includes simple calculated values) are calculated, wherein x coordinate values, y coordinate values and z coordinate values are registered for each calculation point ID, which is an identifier of the calculation point.

The physical quantity is a value such as a scalar value, vector value or a tensor value. Then, the visualization data is data such as data for displaying a contour surface of these values, data for displaying objects such as lines, arrows, ellipses and the like based on vectors or tensors, data for displaying an external shape that is understood from physical quantities (for example, an object after cutting, which is obtained by simulation of a machine tool or the like). When the physical quantity is data for particles, a display with the particles is carried out.

FIG. 8 represents data that defines elements formed by calculation points, and particularly represents data that defines line elements. More specifically, for each element ID of the line element, calculation point IDs of both edges are registered. In addition, elements are not limited to the line elements, and when an element is a quadrangle element, then as illustrated in FIG. 9, calculation point IDs of four vertices are registered for each element ID. In addition to this, hexahedron elements or other elements may be defined.

Furthermore, the coordinates of the center point (in some cases, a feature point such as the center of gravity) are also registered for each element. As illustrated in FIG. 10, the x coordinate, y coordinate and z coordinate of the center point are registered for each element ID.

As illustrated in FIG. 11, the calculated physical quantity for the calculation point is registered for each calculation point ID.

Incidentally, in this embodiment, such data sets are prepared for each unit time, for example. In other words, plural data sets are stored into the numerical data storage unit 502. In this case, FIG. 7 to FIG. 11 represent only one data set.

Data as illustrated in FIG. 12 is stored in the initial setting data storage unit 507. In the example in FIG. 12, the shape (for example, a circle) of the mask surface 200, color (for example, adaptive setting as described below (Adaptive), or a fixed color setting (for example, "white")), α value, distance from the camera position, initial camera position and initial direction of the sight line are set into the initial setting data storage unit 507.

Next, the processing by the visualization data display processing apparatus 5 will be explained using FIG. 13 to FIG. 26. It is presumed that, as described above, the numerical data obtaining unit 501 obtains the numerical data that is the object of the processing from the file server 3 and stores the obtained data into the numerical data storage unit 502.

Moreover, it is presumed that the visualization processing unit 512 carries out a known visualization data generation processing for the first numerical data stored in the numerical data storage unit 502 in response to an instruction from the drawing instruction unit 515 or from the outside such as a user, and stores polygon data for the first numerical data into the polygon data storage unit 514. For example, data such as in FIG. 13A to 13C are generated. FIG. 13A illustrates an example in which, for each object, all of the generated polygon IDs are registered. FIG. 13B illustrates an example in which, for one polygon, the color, α value, and vertex IDs for that polygon are registered. FIG. 13C illustrates an example in which the x-coordinate value, y-coordinate value and z-coordinate value are registered for each vertex.

Figure 14:
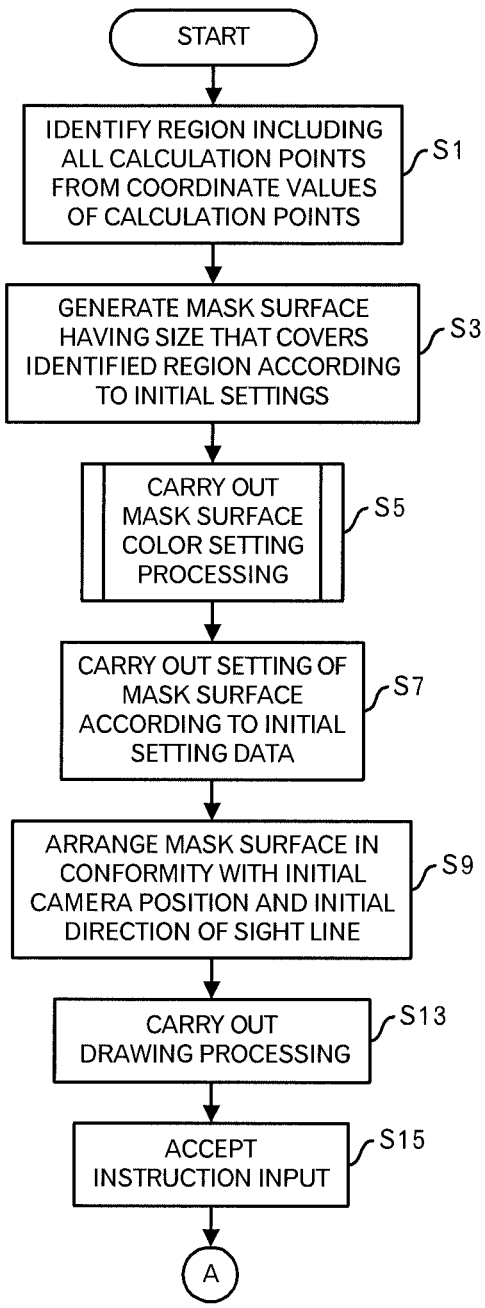
FIG. 14 is a diagram depicting a main processing flow in this embodiment.
Figure 15A:
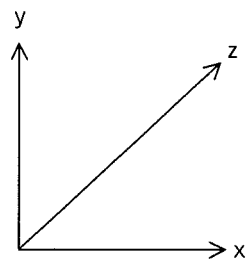
FIGS. 15A and 15B are diagrams to explain a region that is identified from the numerical data and the size of the mask surface.
Figure 15B:
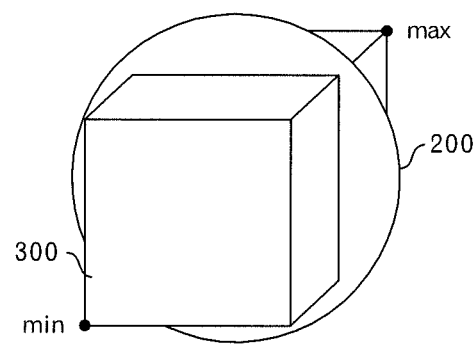

Then, the region calculation unit 505 identifies a region that includes all of the calculation points from the coordinate values of the calculation points that are included in the numerical data stored in the numerical data storage unit 502, and stores the data of the identified region into the region data storage unit 506 (FIG. 14: step S1). In a virtual 3D space mapped by an x-axis, y-axis and z-axis as illustrated in FIG. 15A, a region 300 that covers all of the calculation points is identified as illustrated in FIG. 15B. More specifically, the minimum value of the x coordinate, the minimum value of the y-coordinate and the minimum value of the z-coordinate in the calculation points are identified, to set a point "min" as illustrated in FIG. 15B. Furthermore, the maximum value of the x coordinate, the maximum value of the y-coordinate and the maximum value of the z-coordinate in the calculation points are identified, to set a point "max" as illustrated in FIG. 15B. A rectangular solid having these min point and max point as the vertices at opposing corners is identified as the region described above.

Next, the mask surface generator 509 uses data of the region stored in the region data storage unit 506, and the initial setting data that is stored in the initial setting data storage unit 507 to generate a mask surface (more specifically, polygon data) having a size that covers the region identified at the step S1, and stores the data of the generated mask surface into the mask surface data storage unit 511 (step S3). For example, in the case of the initial setting data such as illustrated in FIG. 12, the shape is a "circle". Therefore, as schematically illustrated in FIG. 15B, the mask surface generator 509 generates a disk-type mask surface 200 that is perpendicular to the z-axis and has a diameter that sufficiently covers all of the surfaces of the region, for example. The mask surface may be such that it covers one of the surfaces of the region. However, the mask surface 200 is perpendicular to the direction of the sight line and it moves in connection with change of the direction of the sight line. Therefore, it is preferable that the mask surface 200 has a size such that it sufficiently covers all of the surfaces of the region.

The generated polygon data has data structure as well as the polygon data of the visualization data 100 as illustrated in FIG. 13A to FIG. 13C.

Figure 16:
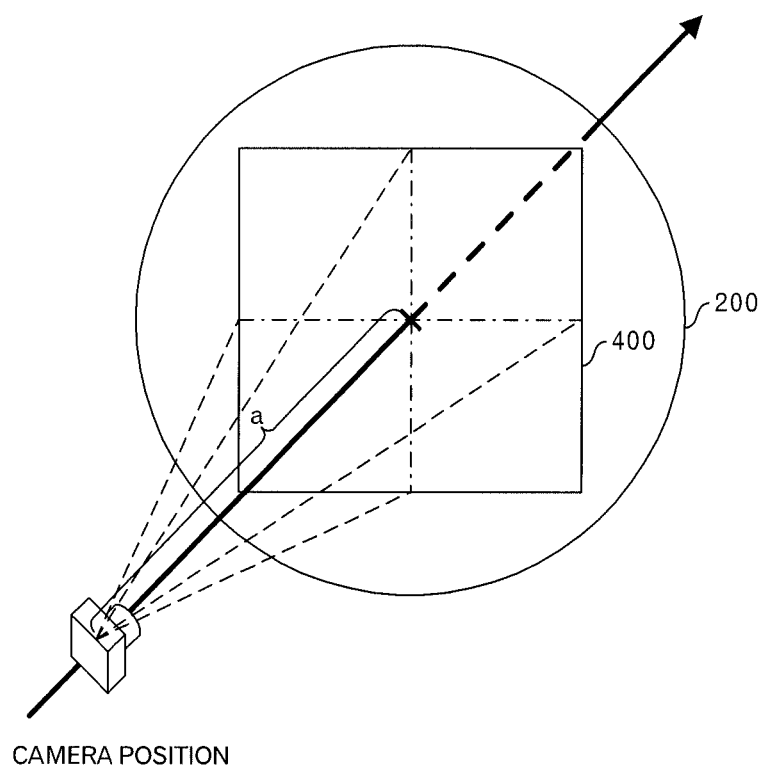
FIG. 16 is a diagram to explain the size of the visible region and mask surface.
Figure 17:
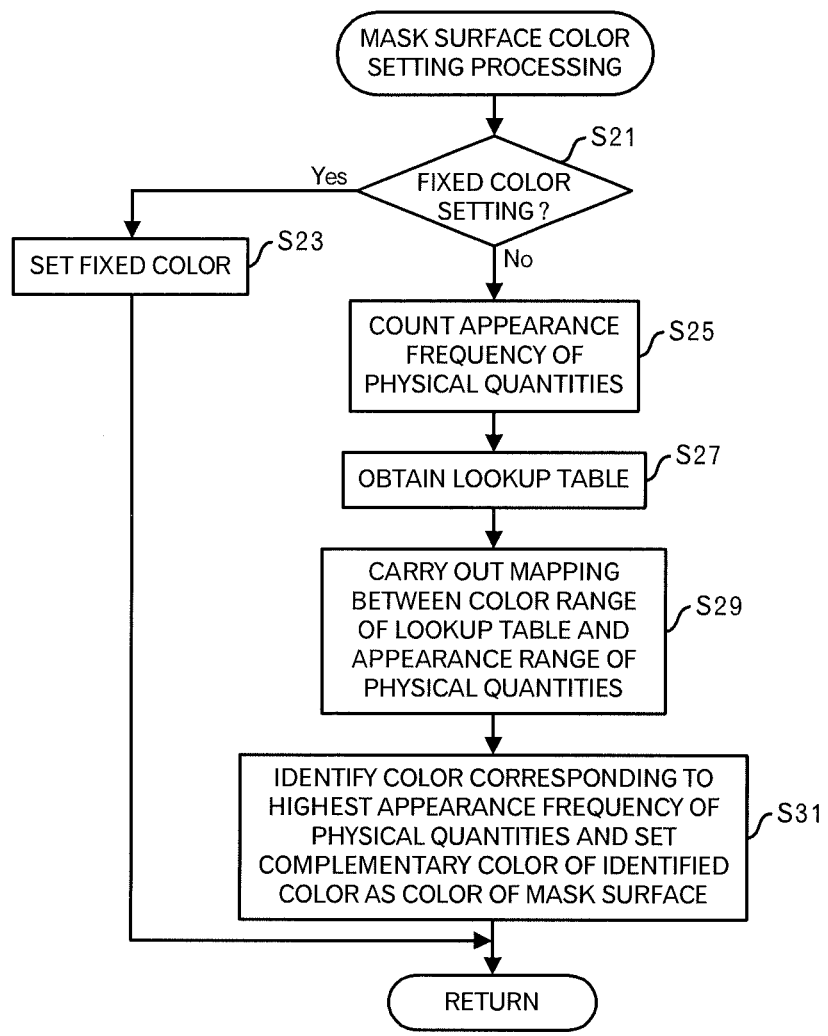
FIG. 17 is a diagram depicting a processing flow of a mask surface color setting processing.

Furthermore, as illustrated in FIG. 16, the size of the mask surface is set such that a visible region 400 as seen from the camera position can be covered. Normally, the visible region 400 becomes larger the farther away it is from the camera position. Therefore, for example, the size of the visible region 400 at the max point is calculated using data such as the initial camera position, and the size of the mask surface 200 is determined such that it becomes larger than that size.

Then, the mask surface setting unit 510 carries out a processing to set the color of the mask surface (step S5). This processing to set the color of the mask surface will be explained using FIG. 17 to FIG. 19. First, the mask surface setting unit 510 checks the setting of the color in the initial setting data that is stored in the initial setting data storage unit 507, and determines whether a fixed color has been set (step S21). For example, when a fixed color such as "white" is set, the mask surface setting unit 510 sets that fixed color to the polygon data of the mask surface 200, which is stored in the polygon data storage unit 514 (step S23). The processing then returns to the calling-source processing.

In the case of the fixed color, instead of setting only one color, plural colors may be set. For example, when the mask surface 200 is a circle, the color may be set such that the color changes from the center of the circle toward the circumference. Moreover, in the case of a setting for mapping some kind of texture, data for texture mapping is stored into the polygon data storage unit 514.

Figure 18:
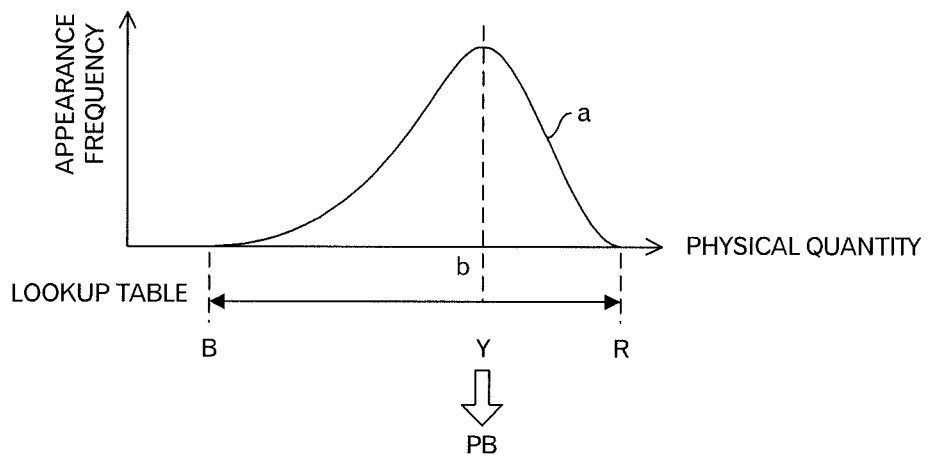
FIG. 18 is a diagram to explain the mask surface color setting processing.

On the other hand, in the case of the adaptive setting (Adaptive) instead of the fixed color, the mask surface setting unit 510 counts the frequency of appearance of physical quantities at the respective calculation points, which are included in the numerical data stored in the numerical data storage unit 502 (step S25). As illustrated at the top of FIG. 18, when the frequency of appearance is plotted for each value of the physical quantity in a graph where the physical quantity is expressed along the horizontal axis and the frequency of appearance is expressed along the vertical axis, a distribution such as a curve "a" is obtained. Then, the mask surface setting unit 510 reads out data from a lookup table 508 (step S27), and carries out the mapping between a color range that is defined in the lookup table 508 and an appearance range of the physical quantity (step S29). From the graph at the top of FIG. 18, it is possible to know the appearance range of the physical quantity, and here the colors on both ends of the color range that is defined by the lookup table 508 (blue (B) and red (R) in FIG. 18) are correlated with the lower limit value and upper limit value of the physical quantity, and colors within the color range (colors from blue to red in FIG. 18) are correlated with each value from the upper limit value to the lower limit value of the physical quantity.

The mask surface setting unit 510 then identifies the color corresponding to the physical quantity having the highest frequency of appearance, and sets a complimentary color of the identified color as the color of the mask surface 200 to the polygon data for the mask surface 200 (step S31). Such a kind of color setting data is stored into the data storage unit 518. Then, the processing returns to the calling source processing.

Figure 19:
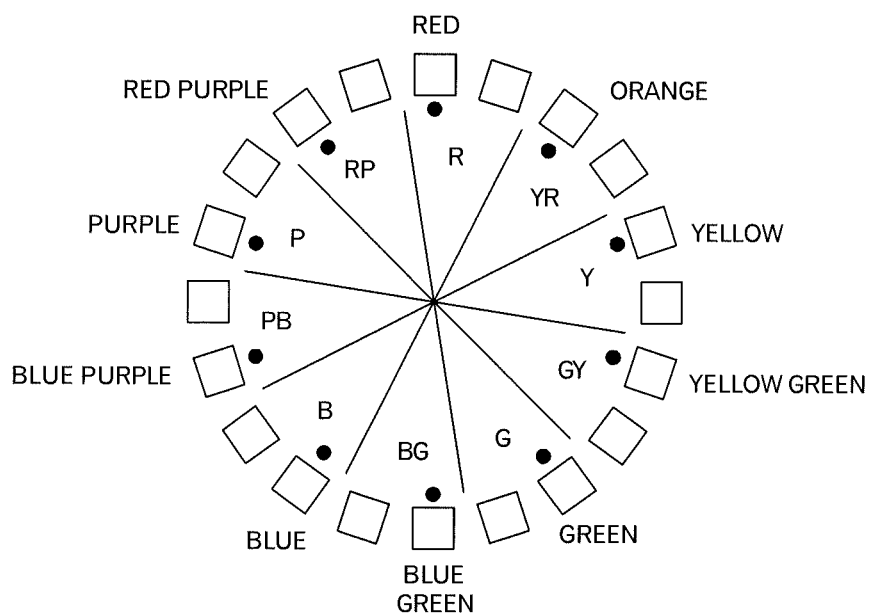
FIG. 19 is a diagram depicting an example of a color map.

In the example in FIG. 18, when the physical quantity "b" having the highest frequency of appearance is identified, the mask surface setting unit 510 identifies the color Y (yellow) that is correlated by the mapping. Furthermore, the mask surface setting unit 510 has a color map as illustrated in FIG. 19. On this color map, a color is arranged around the circle so that a color obtained by rotating from the identified color by 180 degrees on the diameter of the circle is a complimentary color. Therefore, when the color Y is identified, it is possible to identify as the complimentary color, purple blue PB obtained by rotating from the identified color Y by 180 degrees. This complimentary color is used as the color of the mask surface 200.

In this way, since the mask surface 200 becomes the complimentary color of the color having the highest frequency of appearance in the visualization data 100, the portion of interest in the visualization data 100, which is located in front of the mask surface 200, becomes easy to see. However, this is based on the color distribution of the entire visualization data 100 and not the color scheme of the portion of interest. Therefore, the color having the highest frequency of appearance for the entire visualization data 100 is not necessarily the same color as the color having the highest frequency of appearance in the portion of interest. Therefore, in the processing described below, it is possible to change the color to a color that is easier to see.

Returning to the explanation of FIG. 14, the mask surface setting unit 510 further carries out a setting of the mask surface 200 according to the initial setting data (step S7). For example, when the setting for the α value is included in the initial setting data, the α value included in the initial setting data is set as the α value of the polygons. This α value may be a constant value over the entire surface of the mask surface 200, or a distribution of the α values may be defined and set. For example, the α value may be increased or decreased according to the distance r from the center of the circular mask surface 200. In other words, transparency may be increased or decreased going from the center of the mask surface toward the circumference.

The mask surface setting unit 510 then arranges the mask surface 200 in the virtual 3D space by calculating the coordinate values of each of the polygon vertices included in the mask surface 200 according to the initial camera position and initial direction of the sight line, which are included in the initial setting data (step S9). For example, as illustrated in FIG. 2, the distance from the initial camera position to the center of the mask surface 200 (here the center is used, however, this might be any other predetermined point) is "d0" (in FIG. 2 this is "a", however, initially this is "d0"), and the mask surface 200 is arranged so that the center orthogonally crosses the straight line in the direction of the initial sight line. Calculation of the coordinates for such an arrangement can be carried out by known operations, so an explanation is omitted here.

When the processing up to the step S9 is carried out as described above, data for initial drawing has been generated. Therefore, the drawing instruction unit 515 outputs the data stored in the polygon data storage unit 514 and the data of the initial camera position and initial direction of the sight line, which is stored in the initial setting data storage unit 507, to the graphics processing unit 516, and causes the graphics processing unit 516 to execute the drawing (step S13). The graphics processing unit 516 roughly carries out a processing as described below.

For example, for each vertex of each polygon, the graphics processing unit 516 carries out vertex transformation such as expansion, reduction, rotation, translation, and perspective transformation according to the initial camera position and initial direction of the sight line, and also carries out a lighting processing. The graphics processing unit 516 determines the color for each pixel within each polygon, based on the colors and α values of the vertices, and writes the determined color into the frame buffer. When doing this, the graphics processing unit 516 carries out a hidden surface elimination processing using a Z buffer or the like. The drawing data that is written in the frame buffer is outputted and displayed onto the display device 517. Such a processing is well known, so no more will be mentioned about it here. At the polygon level, whether it is a polygon for a mask surface 200, or a polygon for the visualization data 100 is not distinguished.

By performing the aforementioned processing, a display such as illustrated in FIG. 3, for example, is displayed on the display device 517, in a condition such as illustrated in FIG. 2.

However, in the processing described above, the display is carried out based on the initial setting data without receiving any instruction from the user. Therefore, the setting for the mask surface 200 may not be correct, or in other words, the portion of interest in the visualization data 100 may not be located in front of the mask surface 200. Therefore, the input unit 503 receives an input from the user (step S15). The instruction data is stored into the instruction data storage unit 504. The processing then moves to the processing in FIG. 20 via a terminal A.

Figure 20:
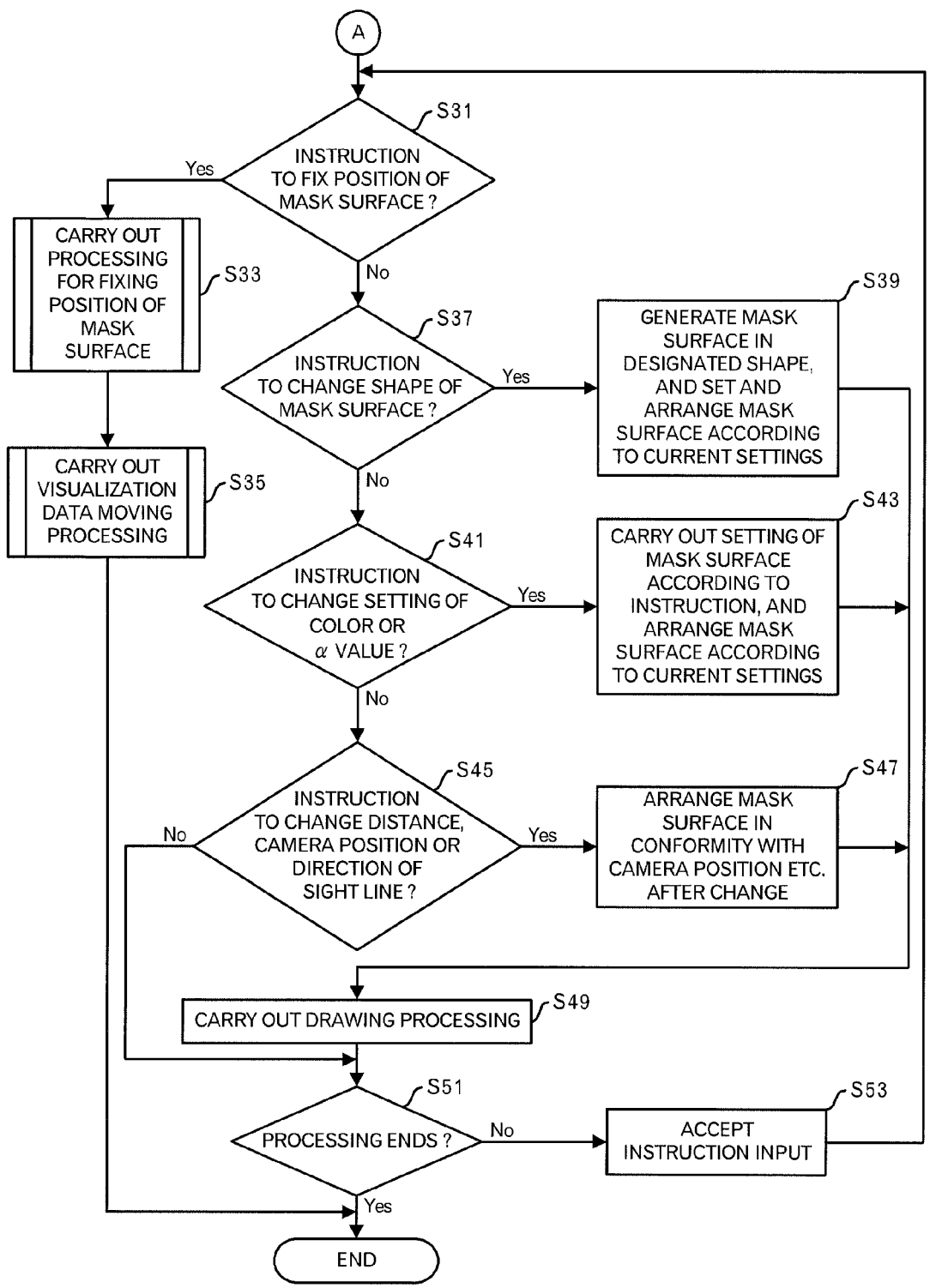
FIG. 20 is a diagram depicting the main processing flow in this embodiment.

Moving to an explanation of the processing in FIG. 20, the mask surface generator 509, mask surface arrangement unit 513 and mask surface setting unit 510 determine, based on instruction data that is stored in the instruction data storage unit 504, whether an instruction is a positioning instruction to fix the position of the mask surface 200 (step S31). In this embodiment, before the positioning instruction, the user inputs an instruction such as described below to instruct that the portion of interest in the visualization data 100 is adequately arranged in front of the mask surface 200. When the instruction is not a positioning instruction to fix the position of the mask surface 200, the mask surface generator 509, mask surface arrangement unit 513 and mask surface setting unit 510 determine whether the instruction is an instruction to change the shape of the mask surface 200 (step S37).

When designation of the shape is included in the instruction data, the mask surface generator 509 generates a mask surface 200 having the designated shape according to data stored in the region data storage unit 506, and when the settings for the color and α value are newly set before this step, the mask surface setting unit 510 sets the color and α value for the mask surface 200 generated this time according to the settings stored in the data storage unit 518, and when the color and α value are not newly set before this step, the mask surface setting unit 510 sets the color and α value of the mask surface 200 generated this time according to the initial setting data. Furthermore, when the camera position, the direction of the sight line, or the distance from the camera position or a combination of two or more of these is changed before this step, the mask surface arrangement unit 513 arranges the mask surface 200 in the virtual 3D space by calculating the coordinate values of the vertices for each polygon included in the mask surface 200 according to currently effective settings that are stored in the data storage unit 518 or initial setting data storage unit 507 (data stored in the data storage unit 518 has preference), and when there are no such changes before this step, the mask surface arrangement unit 513 arranges the mask surface 200 in the virtual 3D space by calculating the coordinate values of the vertices for each polygon included in the mask surface 200 according to the initial setting data (step S39). The mask surface 200 is arranged so that the distance from the camera position to the center of the mask surface 200 is "d", which was set, and the mask surface 200 orthogonally crosses the straight line in the direction of the sight line at the center of the mask surface 200. Then, the processing moves to the processing of step S49.

Figures 21, 22, 23:
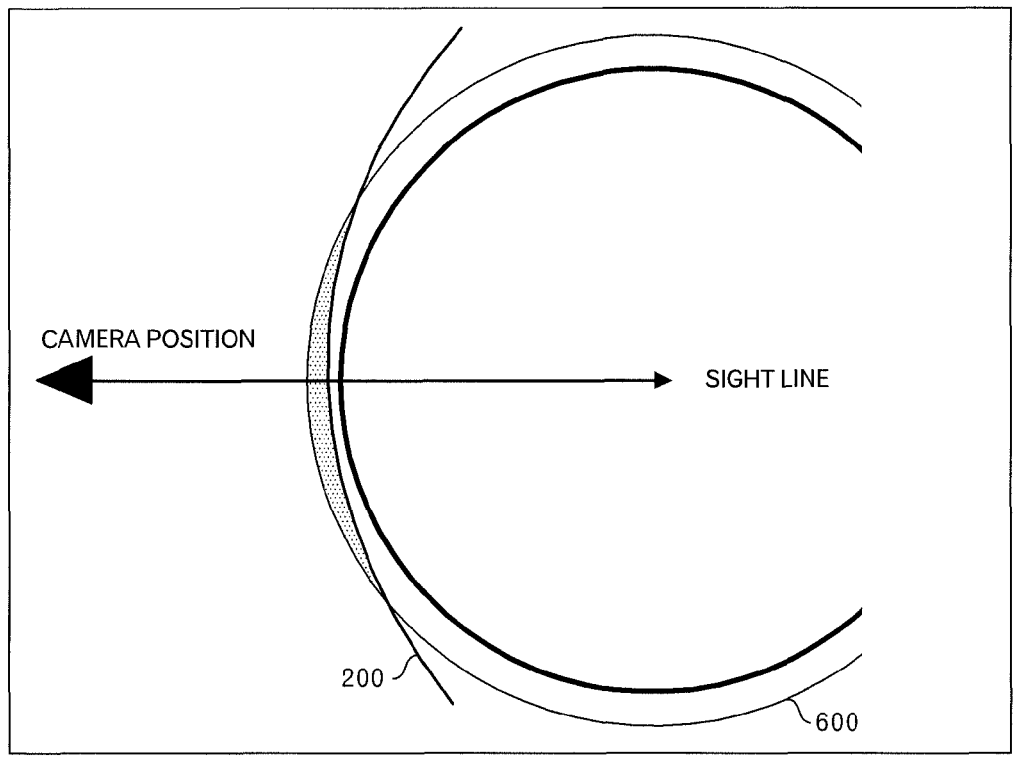
FIG. 21 is a diagram depicting another example of a shape of the mask surface.
FIG. 22 is a diagram depicting an example of data stored in a data storage unit.
FIG. 23 is a diagram depicting an example of data stored in the data storage unit.

At the step S39, as illustrated in FIG. 21, for example, the mask surface 200 may be changed from a flat plate to a curved surface having predetermined curvature. For example, in the case of the visualization data 100 having an outer edge section 600 of the calculation points, in which the calculation points are defined in spherical coordinates and which have predetermined curvature, the mask surface 200 having the same curvature may be used. In this case as well, the hatched section, which is the portion of interest, is observed from the camera position.

On the other hand, when the instruction is not an instruction to change the shape of the mask surface 200, the mask surface generator 509, the mask surface arrangement unit 513 and the mask surface setting unit 510 determines whether the instruction is an instruction to change the color or the α value or both (step S41). When designation of the color or the α value or both is included in the instruction data, the mask surface setting unit 510 stores the designated color or α value or both of them into the data storage unit 518. The mask surface setting unit 510 then carries out the setting for the color or the α value or both for the mask surface 200 that is stored in the mask surface data storage unit 511. Furthermore, when the camera position, the direction of the sight line, the distance from the camera position or a combination of two or more of these has been changed before this step, the mask surface arrangement unit 513 arranges the mask surface 200 in the virtual 3D space by calculating the coordinate values of the vertices of each polygon included in the mask surface 200 according to the current effective settings that are stored in the data storage unit 518 or the initial setting data storage unit 507, and when they have not been changed before this step, the mask surface arrangement unit 513 arranges the mask surface 200 in the virtual 3D space by calculating the coordinate values of the vertices of each polygon included in the mask surface 200 according to the initial setting data (step S43). The processing by the mask surface arrangement unit 513 is the same as that at the step 39. Then, the processing shifts to the step S49.

On the other hand, when the instruction is not an instruction to change the color, α value or both of them for the mask surface 200, the mask surface generator 509, mask surface arrangement unit 513 and mask surface setting unit 510 determine whether the instruction is an instruction to change the distance from the camera position to the mask surface 200, the camera position or the direction of the sight line (step S45). When the distance, camera position or direction of the sight line or a combination of two or more of these is included in the instruction data, the mask surface arrangement unit 513 stores the distance, camera position or direction of the sight line or a combination of two or more of these into the data storage unit 518. For example, the mask surface arrangement unit 513 stores data such as illustrated in FIG. 22 into the data storage unit 518. However, FIG. 22 illustrates the case in which all of the camera position, direction of the sight line and the distance have been changed, and illustrates an example in which the x-coordinate value, y-coordinate value and z-coordinate value of the camera position, the x-coordinate value, y-coordinate value and z-coordinate value of the direction of the sight line, and the distance are stored. The data that has not been changed may be stored or not stored into the data storage unit 518.

When there are changes to the settings, the mask surface arrangement unit 513 arranges the mask surface 200 the in virtual 3D space by calculating the coordinates of the vertices for each polygon included in the mask surface 200 according to the changed settings, and when there are no changes to the settings, by calculating the coordinates of the vertices for each polygon included in the mask surface 200 according to the initial settings (step S47). The mask surface 200 is arranged so that the distance from the camera position to the center of the mask surface 200 is "d", which was set, and the mask surface 200 orthogonally crosses the straight line of the direction of the sight line at the center of the mask surface 200. Then, the processing moves to the step S49.

On the other hand, when the instruction is not an instruction to change the distance from the camera position to the mask surface, the camera position, or the direction of the sight line, the instruction is not an instruction that is handled by this embodiment, so the processing moves to step S51.

At the step S49, as carried out at the step S13, the drawing instruction unit 515 outputs the data stored in the polygon data storage unit 514, data for the camera position and direction of the sight line, which is stored in the initial setting data storage unit 507 or in the data storage unit 518 and the like to the graphics processing unit 516, and causes the graphics processing unit 516 to execute the drawing. Then, the processing moves to the step S51.

At the step S51, when the processing is not terminated, the processing waits for the next instruction input, and after the next instruction is inputted from the user, the input unit 503 receives that instruction input (step S53), and stores the instruction data into the instruction data storage unit 504. Then, the processing returns to the step S31. On the other hand, when the processing is terminated, the processing ends.

By performing such a kind of processing, the position, color and shape of the mask surface 200 can be changed so that the portion of interest in the visualization data 100 can easily be discerned. In the processing above, the center (or other predetermined point) of the mask surface 200 is often used. Therefore, as illustrated in FIG. 23, it may be stored into the data storage unit 518.

On the other hand, when the instruction is determined at the step S31 to be the positioning instruction to fix the position of the mask surface 200, after the processing for fixing the position of the mask surface has been carried out (step S33), the visualization data moving processing is carried out (step S35). Then, the processing end.

Figures 24, 25:
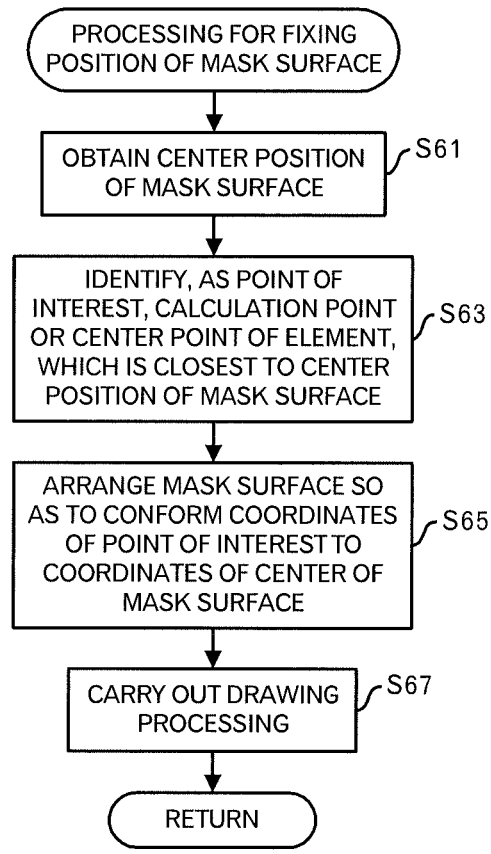
FIG. 24 is a diagram depicting a processing flow of a processing for fixing position of mask surface.
FIG. 25 is a diagram depicting an example of data stored in the data storage unit.

This processing for fixing the position of the mask surface will be explained using FIG. 24 and FIG. 25. First, the mask surface arrangement unit 513 obtains the center position of the mask surface 200 from the data storage unit 518 (step S61). At this stage, the mask surface arrangement unit 513 may calculate the center position of the mask surface 200 and store it into the data storage unit 518. The mask surface arrangement unit 513 then identifies, as the point of interest, the calculation point or the center point of an element closest to the center position of the mask surface 200 or the like from the numerical data storage unit 502, and stores the ID of the point of interest into the data storage unit 518 (step S63). The mask surface arrangement unit 513 calculates the distance using the coordinate values registered in FIGS. 13A to 13C and the coordinate values of the center position of the mask surface 200, and identifies the calculation point of the shortest distance. Then, as illustrated in FIG. 25, the mask surface arrangement unit 513 stores the ID of the identified calculation point as the ID of the point of interest. The center position of the mask surface 200 and the point of interest are correlated by the data in FIG. 23 and FIG. 25.

The mask surface arrangement unit 513 then arranges the mask surface 200 so that the coordinate values of the point of interest coincide with the coordinates of the center point in the mask surface 200 (step S65). More specifically, in order to make the coordinates of the point of interest coincide with the coordinates of the center point of the mask surface 200, the mask surface 200 is translated, and the calculation for this translation is carried out for all of the vertices of all of the polygons of the mask surface 200. As a result, the polygon data for the mask surface 200 after the translation is stored into the polygon data storage unit 514.

Then, as carried out at the step S13, the drawing instruction unit 515 outputs the data stored in the polygon data storage unit 514 and the data for the camera position and direction of the sight line, which is stored in the initial setting data storage unit 507 or the data storage unit 518, to the graphics processing unit 516 and causes the graphics processing unit 516 to execute the drawing (step S67). Then, the processing returns the calling source processing.

In this way, correlation between the center position of the mask surface 200 and the point of interest is completed for the first numerical data stored in the numerical data storage unit 502, and the display is then made.

Figure 26:
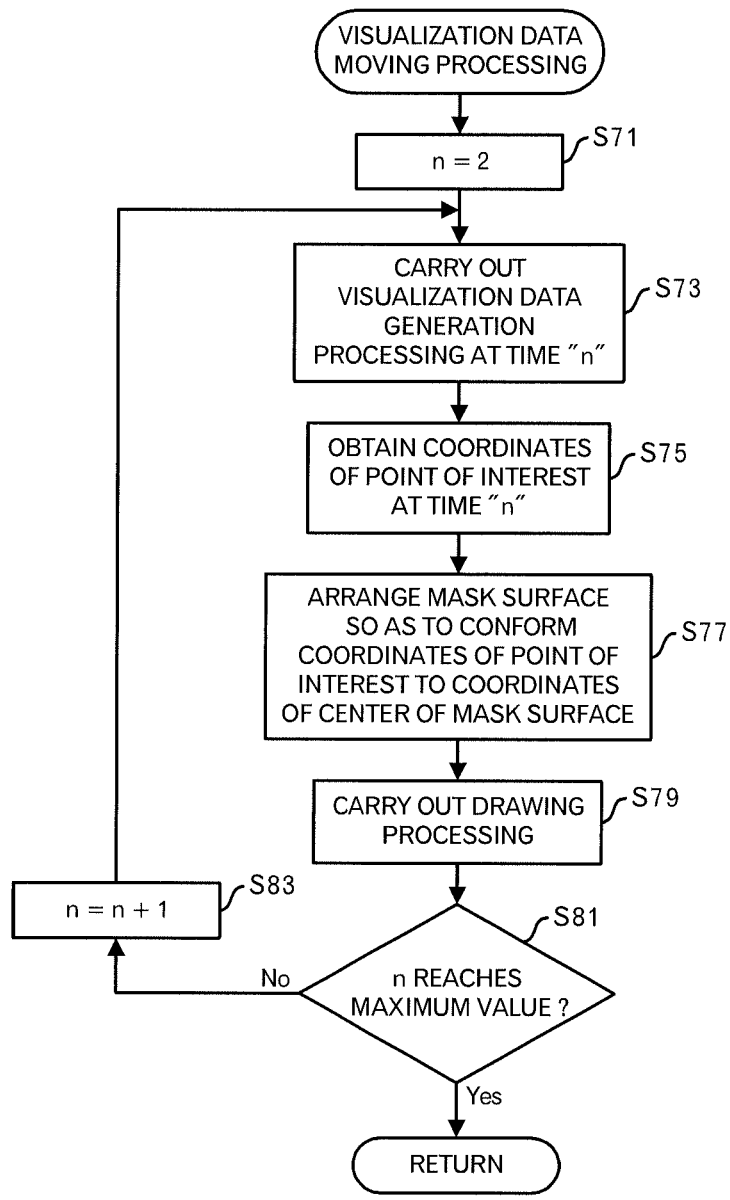
FIG. 26 is a diagram depicting a processing flow of a visualization data moving processing.

Next, the visualization data moving processing will be explained using FIG. 26. Because the visualization data 100 and mask surface 200 arranged at a suitable position for the first numerical data have already been illustrated, the processing for displaying the second and subsequent visualization data 100 and mask surface 200 that is linked with the movement of the visualization data 100 will be explained below.

First, the drawing instruction unit 515 sets "2" to the counter n (step S71). Next, in response to an instruction from the drawing instruction unit 515, for example, or when a user externally instructs the visualization processing unit 512 to carry out continuous visualization of the numerical data, the visualization processing unit 512 carries out a visualization data generation processing using the numerical data at time n, and stores the resulting polygon data into the polygon data storage unit 514 (step S73). In addition, the drawing instruction unit 515 outputs an instruction to the mask surface arrangement unit 513, and in response to this instruction, the mask surface arrangement unit 513 reads out the ID of the point of interest from the data storage unit 518, and further reads out the coordinates of the point of interest at time n from the numerical data storage unit 502 (step S75). The mask surface arrangement unit 513 arranges the mask surface 200 so that the coordinates of the point of interest coincide with the coordinates of the center of the mask surface 200 (step S77). The operations for translating the coordinates of the center of the mask surface 200 stored in the data storage unit 518 to the coordinates of the point of interest are carried out for all vertices of all polygons in the mask surface 200. The processing results are stored into the polygon data storage unit 514.

Then, the drawing instruction unit 515 outputs the data stored in the polygon data storage unit 514, and the data for the camera position and direction of the sight line, which is stored in the initial setting data storage unit 507 or data storage unit 518 to the graphics processing unit 516 (step S79). The graphics processing unit 516 carries out the drawing onto the display device 517. As a result, the display for the time n is made as illustrated in FIG. 3.

After that, the drawing instruction unit 515 determines whether the "n" has reached the maximum value for the "n" (step S81). For example, this determination is carried out by using the number of sets of numerical data stored in the numerical data storage unit 502 as the maximum value. When the "n" has not reached the maximum value of the "n", the "n" is increased by "1" (step S83) and the processing returns to the step S73. On the other hand, when the "n" has reached the maximum value of the "n", the display is complete. Then, the processing returns to the calling source processing.

By performing the processing described above, even when the visualization data 100 moves, the mask surface 200 follows that movement, so the portion of interest in the visualization data 100 is always arranged in front of the mask surface 200, thus being easy for the user to view.

Although the embodiments of this technique were explained above, this technique is not limited to this. For example, the system configuration as depicted in FIG. 5 may not be employed, and the processing from the numerical simulation to the visualization may be executed in one computer. In addition, the functional block diagram depicted in FIG. 6 is mere an example, and may not always correspond to the actual program module configuration.

Moreover, as long as the processing result does not change, the order of the steps in the processing flow may be exchanged or plural steps may be executed in parallel. Especially, the visualization processing unit 512 may carry out the processing asynchronously with other processing units, and the processing result may be stored in the polygon data storage unit 514. Then, the drawing instruction unit 515 may read out the polygon data at arbitrary timing after the necessary processing is completed.

In addition, an example was explained in which the center position of the mask surface 200 is linked with the position of the calculation point or the like. However, other position of the mask surface 200 such as a position designated by the user, may be linked with the position of the calculation point or the like.

Furthermore, the visualization processing unit 512 may calculate data for a portion of the data stored in the numerical data storage unit 502 and store the calculated data into the numerical data storage unit 502.

Figure 28:
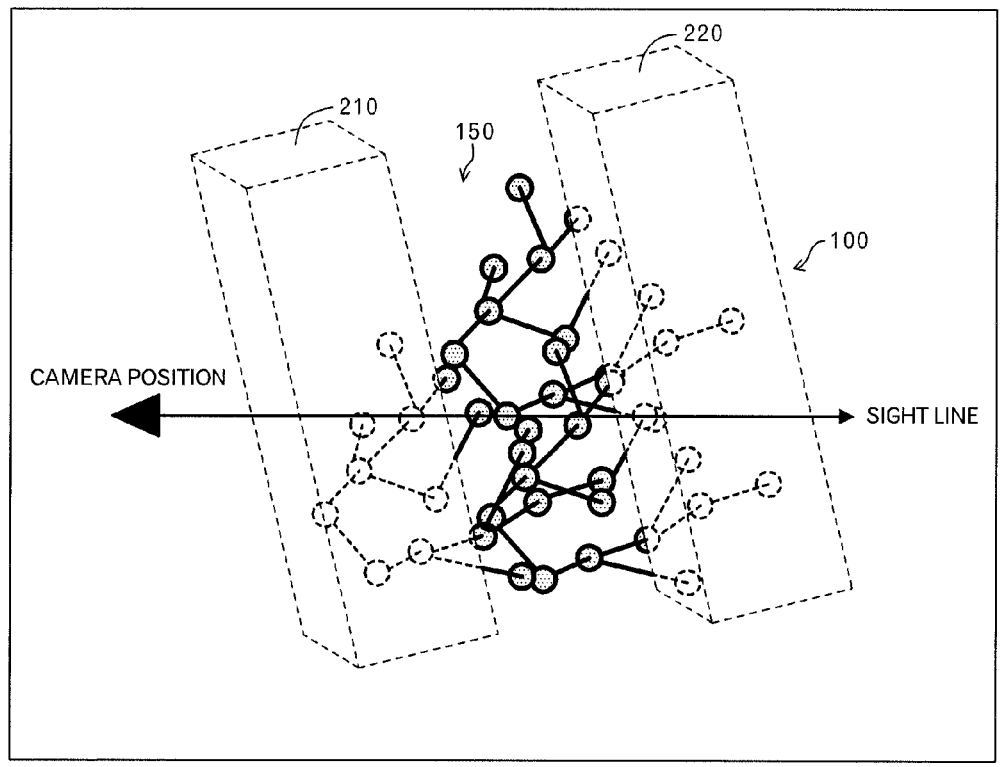
FIG. 28 is a diagram depicting an outline of another embodiment.

Incidentally, when further expanding the aforementioned technique, as schematically depicted in FIG. 28, a solid mask surface 200 may be employed instead of the flat plane or curved surface. Namely, when the portion 150 of interest in the visualization data 100 is in an intermediate portion of the visualization data 100, the aforementioned technique cannot treat this situation. On the other hand, virtual mask objects 210 and 220 are prepared and arranged at appropriate positions, and α value, which means "transparent", is set for a portion of the visualization 100, which is included in the virtual mask objects 210 and 220. Then, it becomes easy to see the portion 150 of interest in the visualization data 100, which is located between the virtual mask objects 210 and 220.

Figure 27:
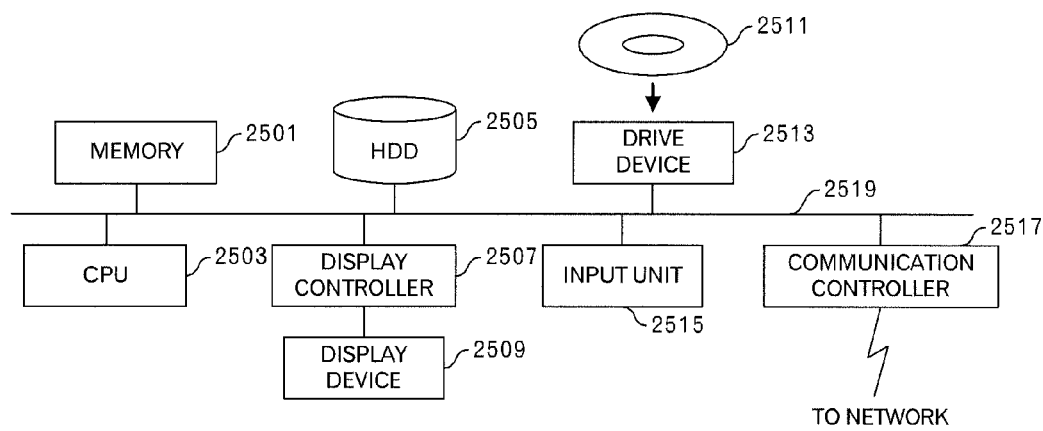
FIG. 27 is a functional block diagram of a computer.

In addition, the visualization data display processing apparatus 5 is a computer device as shown in FIG. 27. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 27. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Incidentally, a portion or entire of the graphics processing unit 516 is implemented as hardware, and the display controller 2507 in FIG. 27 is partially included in the graphics processing unit 516.

Figure 29:
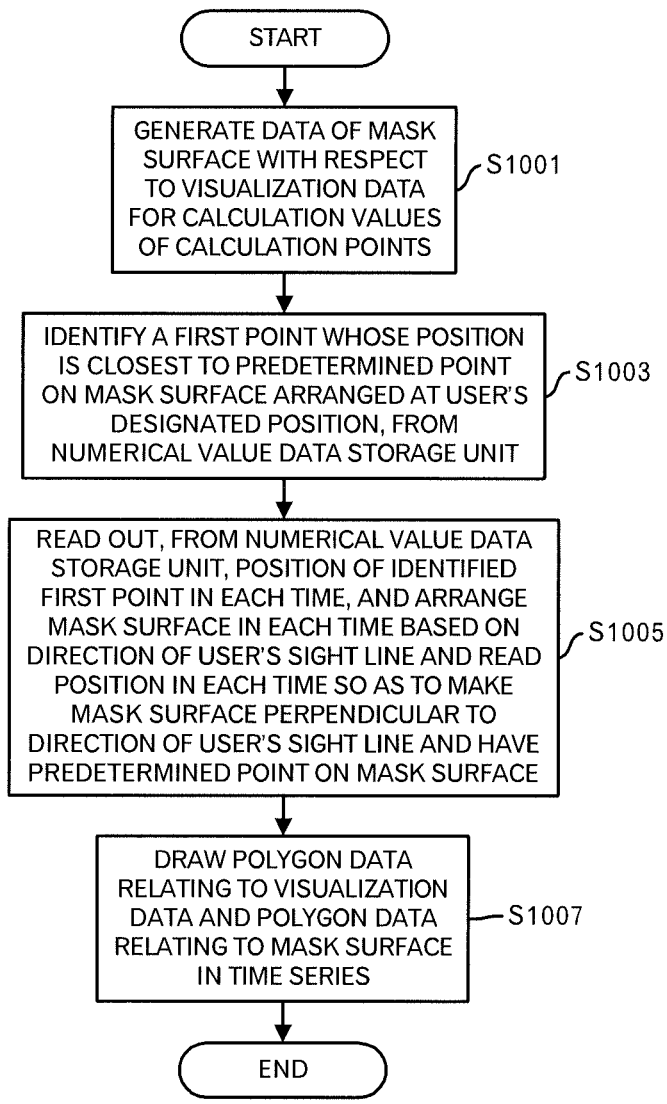
FIG. 29 is a diagram depicting a processing flow of the embodiments.

The aforementioned embodiments are outlined as follows:

A mask processing method (FIG. 29) relating to the embodiments includes: generating data of a mask surface with respect to visualization data for calculation values at respective calculation points, wherein the visualization data is arranged in a virtual three-dimensional space (step S1001 in FIG. 29); identifying, from a numerical value data storage unit storing, as time-series data, positions of the respective calculation points and calculation values at the respective calculation points, a first point whose position is closest to a predetermined point on the mask surface arranged at a position designated by a user (step S1003 in FIG. 29); reading out, from the numerical value data storage unit, a position of the identified first point in each time (step S1005 in FIG. 29); arranging the mask surface in each time based on a direction of a user's sight line and the read position in each time so as to make the mask surface perpendicular to the direction of the user's sight line and have the predetermined point on the mask surface arranged at the read position (step S1005 in FIG. 29); and instructing to draw polygon data relating to the visualization data and polygon data relating to the mask surface in time series (step S1007 in FIG. 29).

Thus, the mask surface follows the specific position of the visualization data, and even when the visualization data changes along the time base time, it becomes possible to easily grasp the portion of interest in the visualization data.

Moreover, the aforementioned generating may include generating data of the mask surface based on a range of the positions of the respective calculation points, which are stored in the numerical value data storage unit. Thus, the mask surface having the size by which the visualization data can be sufficiently covered is generated.

Furthermore, the aforementioned generating include: calculating an appearance frequency of each calculation value, which is stored in the numerical value data storage unit; identifying a calculation value whose appearance frequency is maximum; associating a color range in a lookup table with an appearance range of the calculation values to identify a color associated with the identified calculation value; and setting a complementary color of the identified color as a color of the mask surface. Thus, a color making it easy to see the visualization data is set to the mask surface according to the color arrangement state for the visualization data.

Incidentally, the α value of the aforementioned mask surface may be ununiform on the mask surface. For example, the α value of the mask surface may be set so as to increase or decrease transparency from a center of the mask surface to an outside. For example, when the transparency increases, it becomes possible to easily grasp the portion of much interest in the center portion. Furthermore, the aforementioned mask surface may be a curved surface. For example, the curved surface or the like may appropriately hide the calculation points, depending on the distribution of the calculation points.

Figure 30:
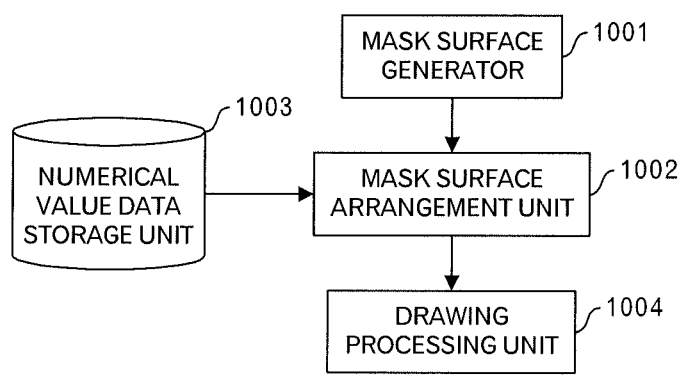
FIG. 30 is a functional block diagram of the embodiments.

In addition, a display processing apparatus of the visualization data includes: a mask surface generator (1001 in FIG. 30) to generate data of a mask surface with respect to visualization data for calculation values at respective calculation points, wherein the visualization data is arranged in a virtual three-dimensional space; a numerical value data storage unit (1003 in FIG. 30) storing, as time-series data, positions of the respective calculation points and calculation values at the respective calculation points; a mask surface arrangement unit (1002 in FIG. 30) to identify a first point whose position is closest to a predetermined point on the mask surface arranged at a position designated by a user, to read out, from the numerical value data storage unit, a position of the identified first point in each time, and to arrange the mask surface in each time based on a direction of a user's sight line and the read position in each time so as to make the mask surface perpendicular to the direction of the user's sight line and have the predetermined point on the mask surface arranged at the read position; and a drawing processing unit (1004 in FIG. 30) to draw polygon data relating to the visualization data and polygon data relating to the mask surface in time series.

A mask processing method according to a second aspect of the embodiments include: generating data of a mask surface for visualization data for calculation values at respective calculation points, wherein the visualization data is arranged in a virtual three-dimensional space; arranging the mask surface at a position away from a camera position by a predetermined distance in a direction of a sight line in the virtual three-dimensional space, according to data stored in a data storage unit (e.g. the initial setting data storage unit 507 and data storage unit 518 in FIG. 6) storing data of the camera position and the direction of the sight line and data defining an arrangement position of the mask surface on the direction of the sight line; instructing to draw first polygon data relating to the visualization data and second polygon data relating to the mask surface without any discrimination of the first and second polygon data; accepting a change instruction of data defining the arrangement position of the mask surface from a user, and updating data relating to the change instruction in the data storage unit; and executing the arranging and the instructing in response to the accepting and updating.

Thus, it becomes possible for the user to designate the area of interest in the visualization data by himself or herself.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process comprising:

generating data of a mask surface with respect to visualization data for calculation values at respective calculation points, wherein the visualization data is arranged in a virtual three-dimensional space;

identifying, from a numerical value data storage unit storing, as time-series data, positions of the respective calculation points and calculation values at the respective calculation points, a first point whose position is closest to a predetermined point on the mask surface;

reading out, from the numerical value data storage unit, a position of the identified first point in each time;

arranging the mask surface in each time based on a direction of a user's sight line and the read position in each time so as to make the mask surface perpendicular to the direction of the user's sight line and have the predetermined point on the mask surface arranged at the read position; and instructing to draw polygon data relating to the visualization data and polygon data relating to the mask surface in time series.

2. The computer-readable, non-transitory storage medium as set forth in claim 1, wherein the generating comprises generating data of the mask surface based on a range of the positions of the respective calculation points, which are stored in the numerical value data storage unit.

3. The computer-readable, non-transitory storage medium as set forth in claim 1, wherein the generating comprises:

calculating an appearance frequency of each calculation value, which is stored in the numerical value data storage unit;

identifying a calculation value whose appearance frequency is maximum;

associating a color range in a lookup table with an appearance range of the calculation values to identify a color associated with the identified calculation value; and setting a complementary color of the identified color as a color of the mask surface.

4. The computer-readable, non-transitory storage medium as set forth in claim 1, wherein an α value of the mask surface is ununiform on the mask surface.

5. The computer-readable, non-transitory storage medium as set forth in claim 1, wherein an α value of the mask surface is set so as to increase or decrease transparency from a center of the mask surface to an outside.

6. The computer-readable, non-transitory storage medium as set forth in claim 1, wherein the mask surface is a curved surface.

7. A computer-readable, non-transitory storage medium storing a program for causing a computer to execute a process comprising:

generating data of a mask surface for visualization, data for calculation values at respective calculation points, wherein the visualization data is arranged in a virtual three-dimensional space;

arranging the mask surface at a position away from a camera position by a predetermined distance in a direction of a sight line in the virtual three-dimensional space, according to data stored in a data storage unit storing data of the camera position and the direction of the sight line and data defining an arrangement position of the mask surface on the direction of the sight line;

instructing to draw first polygon data relating to the visualization data and second polygon data relating to the mask surface;

accepting a change instruction of data defining the arrangement position of the mask surface from a user, and updating data relating to the change instruction in the data storage unit; and executing the arranging and the instructing in response to the accepting and updating, and wherein the generating comprises:

calculating an appearance frequency of each calculation value;

identifying a calculation value whose appearance frequency is maximum;

associating a color range in a lookup table with an appearance range of the calculation values to identify a color associated with the identified calculation value; and setting a complementary color of the identified color as a color of the mask surface.

8. A mask processing method comprising:

generating, by a computer, data of a mask surface with respect to visualization data for calculation values at respective calculation points, wherein the visualization data is arranged in a virtual three-dimensional space;

identifying, from a numerical value data storage unit storing and by the computer, as time-series data, positions of the respective calculation points and calculation values at the respective calculation points, a first point whose position is closest to a predetermined point on the mask surface;

reading out, from the numerical value data storage unit and by the computer, a position of the identified first point in each time;

arranging, by the computer, the mask surface in each time based on a direction of a user's sight line and the read position in each time so as to make the mask surface perpendicular to the direction of the user's sight line and have the predetermined point on the mask surface arranged at the read position; and instructing, by the computer, to draw polygon data relating to the visualization data and polygon data relating to the mask surface in time series.

9. A display processing apparatus comprising:

a memory; and a processor configured to execute a process comprising:

generating data of a mask surface with respect to visualization data for calculation values at respective calculation points, wherein the visualization data is arranged in a virtual three-dimensional space;

identifying, from a numerical value data storage unit storing that stores, as time-series data, positions of the respective calculation points and calculation values at the respective calculation points, a first point whose position is closest to a predetermined point on the mask surface;

reading out, from the numerical value data storage unit, a position of the identified first point in each time;

arranging the mask surface in each time based on a direction of a user's sight line and the read position in each time so as to make the mask surface perpendicular to the direction of the user's sight line and have the predetermined point on the mask surface arranged at the read position; and instructing to draw polygon data relating to the visualization data and polygon data relating to the mask surface in time series.

* * * * *

UNITED STATES PATENT AND TRADEMARK OFFICE
CERTIFICATE OF CORRECTION

| | | |
|---|---|---|
| PATENT NO. | : 8,743,123 B2 | Page 1 of 1 |
| APPLICATION NO. | : 13/110996 | |
| DATED | : June 3, 2014 | |
| INVENTOR(S) | : Watanabe et al. | |

It is certified that error appears in the above-identified patent and that said Letters Patent is hereby corrected as shown below:

On the Title Page Item [73] (Assignees), Line 1, Delete "Fuhitsu" and insert -- Fujitsu --, therefor.
On the Second Title Page Item [56] (Other Publications), Line 16, After "2007," insert -- pp. --.

In the Claims

Column 18, Line 1, In Claim 7, delete "visualization," and insert -- visualization --, therefor.
Column 18, Lines 62-63, In Claim 9, after "unit" delete "storing".

Signed and Sealed this
Twenty-third Day of September, 2014

Michelle K. Lee
*Deputy Director of the United States Patent and Trademark Office*